ANALOG-TO-DIGITAL CONVERTER

Filed Dec. 22, 1960 3 Sheets-Sheet 1

INVENTORS.
CARL P. SPAULDING
EDWIN L. WHEELER
BY
Christie, Parker & Hale
ATTORNEYS.

ANALOG-TO-DIGITAL CONVERTER

Filed Dec. 22, 1960 3 Sheets-Sheet 2

INVENTORS.
CARL P. SPAULDING
EDWIN L. WHEELER
BY Christie, Parker & Hale
ATTORNEYS.

Sept. 18, 1962 C. P. SPAULDING ET AL 3,054,996

ANALOG-TO-DIGITAL CONVERTER

Filed Dec. 22, 1960 3 Sheets-Sheet 3

INVENTORS.
CARL P. SPAULDING
EDWIN L. WHEELER
BY
Christie, Parker & Hale
ATTORNEYS.

United States Patent Office 3,054,996
Patented Sept. 18, 1962

3,054,996
ANALOG-TO-DIGITAL CONVERTER

Carl P. Spaulding, San Marino, and Edwin L. Wheeler, West Covina, Calif., assignors to Datex Corporation, Monrovia, Calif., a corporation of California Filed Dec. 22, 1960, Ser. No. 77,536
14 Claims. (Cl. 340—347)

This invention relates to an analog-to-digital converter and more particularly to a shaft position encoder or digitizer utilizing an improved self-selecting encoding pattern.

An analog-to-digital converter is used in combination with digital processes or systems wherein most of the input information to be processed is in the form of an analog signal, such as a rotating shaft. The positions of a rotating shaft may be encoded or digitized by assigning each shaft position a decimal number and coding the positions by means of binary numbers to represent a complete revolution of the shaft. A principal problem with respect to these analog-to-digital converters or encoders is the provision of a distinct set of binary signals for each change in analog signal or shaft position, without any ambiguities. This implies that the lack of an ambiguous signal would result in no output signal from the encoder that is not directly related to a distinct shaft position. The ambiguities are introduced into the converting system or encoder when adjacent binary numbers differ by more than one binary bit or character and these binary numbers are not simultaneously changed in response to the shaft position changes. These ambiguity problems arise from practical considerations with regard to the alignment tolerances of the encoding and sensing elements. Two general methods for solving these ambiguity problems have been developed. The first is to use a unit distance code such as the Datex or Gray code wherein only one binary character or bit changes in traversing adjacent numbers. The other method is to utilize a pair of sensing elements or two patterns for each of the higher order tracks in combination with logical selection circuitry that is responsive to the binary signal from the single sensing element for a lower order track to select one of the sensing elements or energize one of the two patterns for the higher order tracks and thereby cause the simultaneous switching of all sensing elements. This latter method is a self-selecting technique in which the sensing elements for the higher order tracks are arranged on the coding element to eliminate any possible ambiguity problem due to alignment tolerances.

The self-selecting arrangement has been principally developed in the form of two techniques commonly known as a V and U scan encoding and which common names basically describe the arrangement or pattern for the sensing elements. In the V-scan technique the sensing elements or brushes are aligned with respect to the lower order or selecting track to form a V pattern. The pair of brushes for a single track are respectively advanced or retarded relative to the selector track sensing element and each higher order track is successively spaced farther therefrom. The parity of the next higher order sensing element selects the one succeeding brush for the next higher order tracks. This dual brush arrangement is utilized in the U-scan technique but, although the pairs of sensing elements for each higher order track are arranged in an advanced and retarded relationship with respect to the sensing element for the selector track, the advanced and retarded sensing elements are arranged in alignment. In the U-scan arrangement, however, the parity of the lowest order sensing element selects a group of sensing elements, either the leading or lagging group, whereby all higher order sensing elements are simultaneously selected. The disadvantage of utilizing these double brush techniques is that it doubles the number of sensing elements or brushes and requires an external logical selection circuit for each binary number. Both of these dual sensing element methods have been developed in terms of self-selecting techniques whereby the external circuitry may be reduced to a single external selecting element. The self-selecting V-scan technique utilizes a single external circuit in combination with the lower order information track to select the particular sensing element of the pair of elements for each of the higher order tracks to cause the simultaneous switching thereof. This self-selecting technique, in addition to the need for a pair of sensing elements for the higher order tracks, also requires isolating elements or diodes to prevent incorrect readings.

The U-scan arrangement has also been developed in terms of a self-selecting arrangement. The self-selecting U-scan arrangement has eliminated the need for a pair of sensing elements for each of the higher order tracks by defining the encoding pattern in terms of advanced and retarded segments to perform the same function as the advanced and retarded sensing elements for a non-self-selecting arrangement. These advanced and retarded segments are arranged so as to be electrically isolated and the sensing element selection is made by switching the supply voltage to the sensing element for a selected advanced or retarded segment. This simple substitution of pattern arrangement for sensing element arrangement, however, does not produce an operative encoding arrangement. This inoperativeness has been overcome by introducing a third isolated segment between the advanced and retarded segments. This structure has been disclosed in terms of a contact type of encoding structure wherein the binary numbers are bits are defined in terms of conductive and non-conductive segments. In this type of arrangement, then, a binary number or bit that is represented by a conductive segment is defined by an electrically isolated advanced or leading segment, a retarded or lagging segment, and a third segment that is centrally arranged between the two that is always excited.

The elementary form of self-selecting U-scan arrangement, however, has not been disclosed as employing a single external selecting element but requires that the bit and the binary complement be generated in the high order bit of a lower order band to select the leading or lagging segments for the next higher order band. As disclosed, the control bit is utilized to energize the lagging segments, while the binary complement of the control bit is necessary for energizing the leading segments. The complement of the control bit has been generated by employing an external circuit element, such as a transistor inverter. This then requires an active element between each stage to produce these complements. In addition, the disclosed arrangement of self-selecting U-scan has not eliminated the need for the isolation diodes to prevent the incorrect readings from the encoder.

This invention provides an analog-to-digital converter utilizing an improved and reliable self-selecting U-scan encoder or shaft position digitizer which requires a single external selecting circuit and has eliminated the need for isolation diodes and gating diodes and, thereby, substantially reduces the cost of such a converter. The elimination of diodes avoids the voltage drop through each stage and thereby increases the output voltage. The lack of diodes has further reduced the space and weight requirements and the temperature limitations resulting from the use of diodes has also been eliminated. The reliability is enhanced as a result of reducing the number of elements by a factor of two. In addition, when the true output indication as well as the complement is required, the diodes and external complementing circuit have been eliminated, as well as employing approximately one-half of the number of sensing elements required with other encoding systems.

The encoding element of the present invention is defined with an encoding pattern having a pair of bands of information tracks wherein each information track includes an electrically isolated advanced, or leading, and a retarded, or lagging, segment spaced on opposite sides of a central conductive segment that is continuously engaged. The feeder segments for the central conductive segment traversing a track utilized for energizing a leading or lagging segment is arranged and spaced whereby a feeding sensing element for the feed track will be energized only during an interval that will not effect the output signals from the encoding element. This pattern of feed segments allows the encoder to be utilized without the use of diodes to isolate the electrical feedback signal that would result when a sensing element is presented to one of the feed segments. The feed segments between the bands of information tracks are also arranged in this fashion and out of the path of the sensing elements to prevent incorrect digital output indications.

In addition, the tracks providing the higher binary orders of information that are arranged in the second band may be fed indirectly by means of one of the information tracks in the first band simply by employing additional sensing elements to energize the leading and lagging sensing elements for the corresponding tracks of the second band.

An advantageous feature afforded by the structure of this invention is that the complementary binary information may be derived merely by means of additional sensing elements provided for the information tracks and arranged and spaced thereon to always produce the correct complementary binary signal.

The improved self-selecting pattern of this invention may be further utilized for defining multi-turn encoders wherein encoding elements are defined substantially the same with the exception that the selector tracks may be eliminated for the lower speed encoding elements. Again, the controlled leading and lagging feed segments may be energized directly from the information tracks in the second band of the higher speed disc without resorting to the use of isolating diodes therebetween.

These and other features of the present invention may be more fully appreciated when considered in the light of the following specification and drawings, in which.

Figure 2:
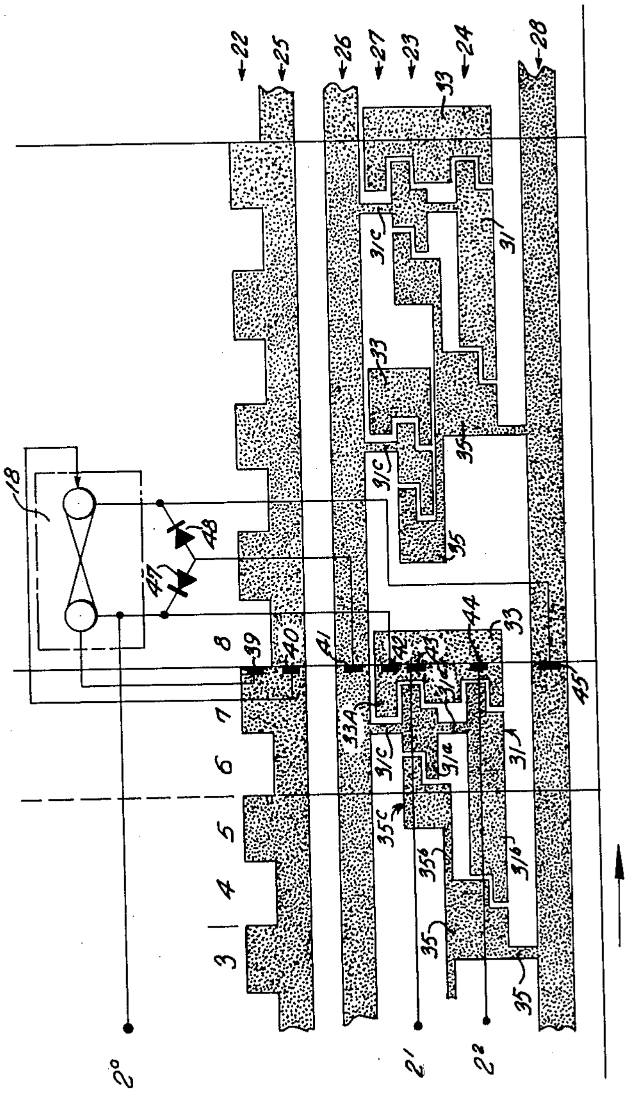
FIGS. 2 and 3 are developed, fragmentary views of the patterns for a plurality of information tracks for a contact-type of encoding arrangement and embodying the invention.
Figure 1:
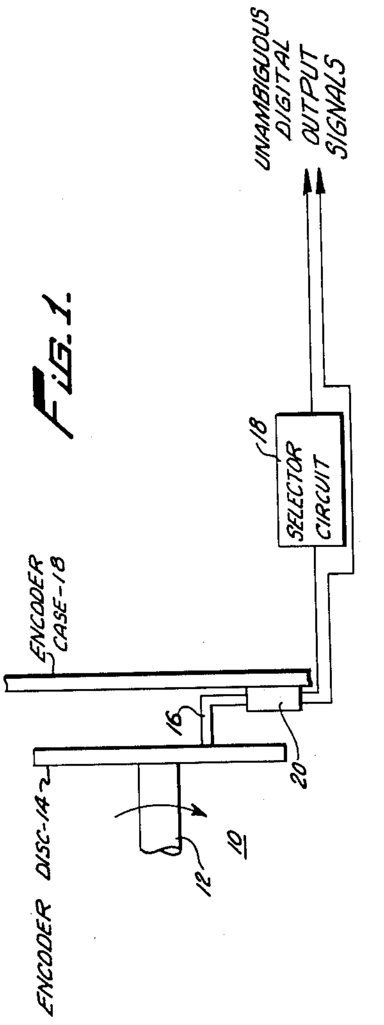
FIG. 1 is a schematic representation of a self-selecting encoding arrangement.

The invention will now be described as embodied in an encoder or shaft position digitizer 10 of the contact type. The analog signal is represented by the positions of a rotating shaft 12 which mounts an encoding element or disc 14 to be rotatable therewith. The encoding disc has the desired pattern of binary coded characters arranged thereon to provide the binary numbers or bits corresponding to each position of the shaft or a unique digital output signal for each change in analog signal. The various binary characters are sensed by means of a plurality of sensing elements shown as the brushes 16 mounted on the case 18 of the encoder and thereby maintained in a relatively stationary position relative to the encoding disc 14. The sensing elements 16 are energized and selected by means of an external selecting element shown as the block 18. The digital output signals are derived from the sensing elements selected by the selector circuit 18 and at least one of the output circuits provided for the selector circuit 18. The binary coded characters for a contact type of encoder are defined in terms of conductive and non-conductive segments and, accordingly, the sensing elements therefor are in the form of electrical brushes which may be arranged in continuous engagement with the face of the encoding disc 14. The sensing elements or brushes 16 then are generally mounted in a brush holder 20 secured to the encoding case 18, and the electrical lead wires for the individual brushes are brought out to the selecting and utilization circuit.

Now referring to FIG. 2, the basic arrangement of the self-selecting pattern recorded on the encoding disc 14 will be described. The encoding disc 14 is arranged in terms of a plurality of concentric tracks with each information track arranged to represent a different binary order with the lowest binary order, or $2^0$, arranged adjacent the outer diameter of the disc and the binary orders progressively increasing inwardly therefrom towards the inner diameter of the encoding disc. The portion of the encoding pattern shown in FIG. 2, in a developed fashion, merely indicates the basic configuration of the desired encoding pattern of this invention for three binary numbers or binary bits, namely, the bits $2^0$, $2^1$, $2^2$. Therefore, only three information tracks are shown in FIG. 2 and are correspondingly identified as tracks 22, 23, and 24, reading from the outer diameter to the inner diameter. The track 22 represents the lowest binary order, or $2^0$, and the pattern thereof is further used as a selector or control track for selecting the advanced, or leading, or retarded, or lagging, segments for the tracks 23 and 24 which represent the binary orders $2^1$ and $2^2$. Since the pattern is arranged in terms of the natural or pure binary code, the track 22 is defined with alternately and sequentially arranged conductive and non-conductive segments of substantially the same length as governed by the alternate one and zero value of the $2^0$ bit for the natural binary code.

The length of the conductive and non-conductive segments on the track 22 govern the length of the leading and lagging segments in the higher order tracks in accordance with the basic selecting U-scan techniques. A track 25 comprising a continuous conductive segment is arranged adjacent the track 22 to provide a continuous feed path with each of the conductive segments for the track 22, as shown. Another continuous conductive segment is arranged in a track 26 which is spaced inwardly from the track 25 a predetermined amount and thereby is electrically isolated therefrom. The tracks 25 and 26 are coextensive with the tracks 22, 23, et cetera. The track 26, however, may be eliminated by the use of feed segments from the track 25 in the same fashion that they are shown for track 26. The particular arrangement shown, however, has been found to be practically desirable with respect to the operation of the external selecting circuit 18. The remaining tracks are identified as a lagging track 27 arranged intermediate the $2^1$ track and the continuously energized track 26, while the leading track 27 is arranged outwardly of the $2^2$ track 24 and is shown as a continuous, conductive segment.

As in conventional self-selecting U-scan patterns, the binary numbers on the lower order tracks, in this instance the $2^0$ track 22, that are represented by a conductive segment are also represented by a conductive segment on the higher order tracks and which conductive segments comprise a central conductive segment similar to the conductive segment 31 and arranged with a body portion $31^a$ arranged in the track 23 and a similar body portion $31^b$ arranged in the track 24. The body portion $31^a$ is connected to the continuous segment for the track 26 by a feeder segment $31^c$ and, in the same fashion, the body portions $31^a$ and $31^b$ are inter-connected by a feeder segment $31^d$. Therefore, the body portions $31^a$ and $31^b$ will be energized continuously as long as the track 26 is connected to a source of excitation. Assuming the direction of movement of the encoding disc 14 is from the left to the right, as illustrated, the conductive segment 33 may be defined as the lagging segment and is spaced from the central conductive segment 31 and completely electrically isolated therefrom as well as from the continuous conductive segments for the tracks 26 and 28. To this end, the lagging segment 33 is arranged to extend transversely of the tracks 27, 23, and 24, and, in this instance, forward of the central conductive segment 31 into the adjacent information portion represented by a non-conductive segment a distance corresponding to half of the length of the segments on the track 22. In the same fashion, the conductive segment 35 is arranged on the opposite side of the central conductive segment 31 and is considered to be the advanced or leading segment. The leading segment 35 extends transversely of the tracks 23 and 24 and, by means of the feeder segment 35$^a$, is electrically connected with the continuous track 28.

It should be noted that the opposite edges of the central conductive segment 31 and the adjacent edges of the lagging and leading segments 33 and 35 respectively are arranged in a complementary and stepped fashion and separated a distance governed by the size of the sensing elements or brushes 16 whereby a sensing element arranged in an information track 23 or 24 will bridge the non-conductive segment arranged therebetween and pass smoothly from one conductive segment to the other without changing its electrical condition when the leading and lagging segments are energized. Stated differently, the junction between a continuously energized segment and selected lead or lag segment is designed to insure that some portion of the sensing element is always in contact with at least one of the energized segments. This complementary, stepped design for the adjacent edges of the segments 31, 33, and 35 is an important, practical consideration of the present improved self-selecting pattern and that other complementary patterns that appear to be equivalent, such as the one having complementary, sloped, or angular, parallel faces, have been found to render the encoder inoperative. The sloped design allows the sensing element to be completely engaged by the insulative segment between the conductive segments.

TABLE I

*Natural Binary Code*

| | $2^0$ | $2^1$ | $2^2$ | $2^3$ |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

Specifically considering the portion of the improved pattern shown in FIG. 2 for the decimal counts four through eight, the configuration of the pattern may be examined in more detail. The segment for the count four is a non-conductive segment as well as the segment for count six. The remaining counts, namely counts five and seven, are represented by conductive segments in track 22. By examining Table I, it will be noted that the $2^1$ bit for count four is a zero and, therefore, the corresponding portion of track 23 should be a non-conductive segment, as illustrated, while the same segment for the $2^2$ bit is a conductive segment and is seen to comprise a portion of the leading segment 35 and the central segment 31. The leading segment 35 arranged in the information track 24 has a conductive path connected with the conductive track 28 by means of the feed segment 35 extending a half count or half the length of the segments in track 22 into the information portion for count three and extends inwardly and across the entire information track 24 to coact with the body portion of the central segment 31. The adjacent edges of the segments 31 and 35 are spaced apart and electrically isolated and defined with the complementary stepped design. Since the binary value of the $2^2$ bit for counts four through seven is a one and for count eight is a zero, the central conductive segment 31 is defined as a continuous segment for the counts four through seven and coacts with the portion of the lagging segment 33 extending into the information portion for count seven in the same fashion as was described for the leading segment 35 during the information portion for count four.

The leading segment 35 extend outwardly of the track 24 by means of a feeder line 35$^b$ arranged between the tracks 23 and 24 with an information portion extending transversely of the track 23 substantially centrally of the information portion for count five and extending therefrom into the information portion for count six, again cooperating with the body portion 31$^a$ arranged therein and which portion also extends in the opposite direction to the information portion for count seven. The outer edge 35$^c$ of the leading segment 35 arranged in track 23 terminates short of the lagging track 27 whereby it is spaced and electrically isolated from the continuous track 26. The lagging segment 33, however, extends into the lagging track 27 but has its adjacent edge 33 spaced from the feed segment 31$^c$ in a parallel relationship.

An important feature of the invention is that the feed segments 31$^c$ merely be spaced from an adjacent conductive segment, such as the lagging segment 33, to prevent erroneous output indications and will be discussed more fully hereinafter. The spacing between a feed segment 31$^c$ and the adjacent edge 33$^a$ of the lagging segment 33 is not critical since when the lagging feed sensing element engages the feed segment 31$^c$, the information sensing elements are energized by the continuously energized segment. That is, when the sensing element for the lagging track 27 engages the energized feed segment 31$^c$, it is spaced from the lagging segment 33 and therefore does not effect its electrical condition. The spacing between the feed segment 31$^c$ and the adjacent edge 33$^a$ of the lagging segment 33 is further defined such that when the sensing element in the track 22 initially senses the conductive segment for count seven, the corresponding sensing element for the $2^1$ track 23 is energized by means of the body portion 31$^a$ of the central conductive segment 31. Immediately thereafter, the sensing element for the lagging track 27 will contact and thereby energize the lagging segment 33 to allow the sensing element for the $2^1$ track to maintain its energized condition when it passes from the central conductive segment 31 to the now energized lagging segment 33 without any change in voltage level. This same arrangement applies for the sensing elements in traversing from an energized leading segment 35 to a central conductive segment 31. The same arrangement will be found to be true for the remaining information portions of the tracks 23 and 24 for the counts illustrated in FIG. 2, as just described for counts four through seven.

By examining Table I it will be noted that not only does the lowest order bit alternate between a zero and one in a cyclic or periodic fashion, but each of the other higher order bits alternate between zero and one but in a different pattern. The $2^1$ bit, for example, may be defined as two zeroes followed by two ones, et cetera, while the $2^2$ bit is defined by means of four zeroes followed by four ones. Therefore, in general, the self-selecting pattern will be seen to be provided with a central conductive segment 31 with a length for representing a binary one as governed by the number of successive binary ones in Table I and, further, to coact with a lagging segment 33 at one end of the count and with a leading segment 35 at the other end. To this end, it will be noted that in track 23 the central conductive segment 31 extends longitudinally therein for the counts six and seven and coacts with the portion of the leading segment 35 that extends from the count five into the information portion for count six and, in the same fashion, coacts with the lagging portion of segment 35 that extends into count seven. In the same fashion, in track 24, the central conductive segment extends from the information area for count four into the area for count seven and correspondingly coacts with the leading and lagging segments extending into the information area for counts three and eight.

The sensing elements or brushes 16 for the above-described pattern are shown arranged in alignment with the leading edge of the conductive segment for count seven. Each of the above-described tracks are provided with a separate sensing element arranged substantially centrally of each track and shown as electrical brushes. The sensing element for the track 22 is identified by the reference character 39 while the feed brush for the track 25 is identified by reference character 40. The brush 41 functions as a feed brush for the track 26, while brushes 42, 43, 44, and 45 are respectively individual to tracks 27, 23, 24, and 28.

The single external selecting circuit 18, as utilized in conventional, self-selecting circuitry, has two input circuits and two output circuits, and which output circuits represent the two stable states thereof. The $2^0$ brush is connected to the input circuit of the selector element 18 whereby its corresponding output circuit will be at a relatively high potential when the brush 39 engages a conductive segment, and, at this time, the other output circuit is at a complementary state or of a relatively low voltage. As is well known, the opposite voltage conditions exist when the brush 39 engages a non-conductive segment. The feed brush 40 is connected to the remaining input circuit of the selector 18. The continuous conductive segment arranged in the track 26 is energized by means of the output circuits provided for the selector 18. To this end, the brush 41 is shown connected in parallel circuit relationship with each of the output circuits by means of separate isolating elements or diodes 47 and 48. The conductive segment therefore will assume a high voltage level by means of the circuit path provided by either the diode 47 or 48 in accordance with the state of the element 18. This, therefore, will cause the conductive track 26 and each of the central conductive segments 31 to be continuously energized. The lagging brush 42 is connected to the output circuit of the selector 18 whereby it corresponds to a binary one whereby it is continuously in the same state of energization as the brush 39. The remaining output circuit for the flip-flop is connected to the leading brush 45 and, accordingly, is responsive to the state of the selecting element 18 in a fashion that is complementary to the energization of the lagging segment 33 or the state of the brush 39. The brushes 43 and 44 are directly connected to the output circuit and provide the electrical signals for indicating the binary value of the $2^1$ and $2^2$ bits. The $2^0$ bit is derived directly from the "one" output circuit from the selector element 18.

The diodes 47 and 48 are not essential to the operation of the encoder and should not be confused with the isolating diodes employed for preventing erroneous output signals employed heretofore. The diodes 47 and 48 are merely used to establish the constant voltage level needed for the continuously energized track 26 from the selector element 18. Therefore, it should be appreciated that they are not essential to the operation of the encoder and may be eliminated if a constant voltage source is available for energizing the track 26. The diodes, however, as a practical matter are included in an encoder.

RULE $2^0=1$ Energize Lagging Segment
$2^0=0$ Energize Leading Segment

The rule for selecting or energizing a leading or lagging segment in terms of the control track or bit may be defined in terms of the value of the $2^0$ bit, that is, when $2^0$ equals one the lagging segment is energized, while when $2^0$ is a zero the leading segment is energized. It will be noted from examining Table I that the $2^0$ bit alternates between the value zero and one.

Now, referring to FIG. 2, the operation of the above-described self-selecting pattern will be discussed. It will be assumed that the sensing elements or brushes are radially aligned across the coding element and are positioned to indicate the decimal count four. The brushes are arranged for this purpose to be in the center of the information portion for the count four. It should, therefore, be appreciated that since the $2^0$ brush is de-energized, or represents a binary zero, the above rule will indicate that the leading segment should be energized at this time and the lagging segment should be de-energized. At this time the $2^1$ brush 43 engages a nonconductive segment and therefore represents a binary zero, and the $2^2$ brush 44 engages an energized leading segment. The count four is therefore seen to be correctly indicated by brushes 39, 43, and 44 as 0 0 1.

As the sensing elements and coding element are relatively displaced in the direction of count five, the $2^0$ brush 39 engages the succeeding conducting segment for the decimal count five. When the leading edge of brush 39 engages the conductive segment for the count five, it will cause the leading segments 35 to be de-energized and simultaneously cause the lagging segments 33 to become energized. During the interval that the brushes traverse from count four to count five, it will be noted that the $2^2$ brush 44, which had bridged the stepped portions of the conducting segments 35 and 31 in the track 24 during the interval for count four will have moved away from the leading segment 35 so as to be completely energized by the continuously energized central segment 31. Therefore, the de-energization of the leading segment 35 as a result of the $2^0$ brush engaging the conductive segment for the count five has no effect and can produce no ambiguity with respect to the digital output indication therefrom. The portion of the leading segment 35 extending into the information segment for the count three placed the brush 44 into engagement with a conductive segment during count three but did not effect the output indication of the brush 44. This merely placed the brush 44 and thereby the leading conductive segment 35 in position to be energized by the selector circuit simultaneously with the de-energization of the brush 39. The transition from the leading conductive segment to the continuously energized segment 31 during the count four interval, likewise, disconnects the brush 44 from the control of the selector circuit 18 to be continuously energized until it is disengaged therefrom. Therefore, the $2^2$ brush 44 is maintained energized continuously for counts five and six. The $2^1$ brush 43 remains continuously de-energized in traversing from count four to count five and remains so even though it engages the leading conductive segment 35 during the count five interval, since during this interval the leading segment is de-energized.

When the $2^0$ brush 39 leaves the count five conductive segment to indicate the binary value zero for the count six, the lagging segment 33 becomes de-energized and the leading segment 35, in turn, energized. At this interval the $2^1$ brush 43 is in engagement with the leading segment 35 and becomes energized along with the $2^2$ brush 44. The three bits therefore read 0 1 1, which is the correct indication for the decimal count six as shown in Table I. The indication remains the same for the entire count six interval and the only change is in the energization of the $2^1$ brush 43 by means of the continuously energized central segment 31 rather than the leading segment 35 as the brush passes therebetween.

When the leading edge of the $2^0$ brush 39 engages the conductive segment for the count seven, the leading segment 35 becomes de-energized and now the lagging segment 33 should be energized. However, at this interval the lagging brush 42 is not in engagement with the lagging segment 33 and, therefore, this segment remains de-energized. This apparent impropriety has no effect on the digital output indication since during this interval the brushes 43 and 44 are and have been continuously energized by the segment 31. Therefore, this arrangement and spacing of the continuously energized feeder segment $31^c$ relative to the adjacent edge $33^a$ of the lagging segment as well as the dimensions of the brush 42 are of no significance with respect to producing an ambiguous or incorrect output indication when the binary complement is not required. The lagging segment 33, however, is further defined by means of the stepped arrangement between the central segment 31 and the lagging segment 33 relative to the width of the brush 43 so that the brush bridges the gap between these segments and may be energized by either one. That is, at this interval of count seven the lagging brush 42 has moved into engagement with the lagging segment 33 and thereby energizes the lagging segment. It will be evident that as the $2^1$ and $2^2$ brushes 43 and 44 move out of engagement with the central segment 31 they are placed wholly under the control of the lagging segment 33 and thereby the selecting element 18 regains control of these brushes 43 and 44. The brushes 43 and 44 are then in position to be simultaneously de-energized for the count of eight while still engaging lagging segment 33.

In the elementary form of the improved pattern which is shown in FIG. 2 and described hereinabove, this self-selecting method is limited as to the total number of binary bits which can be encoded when the coding element is in the form of a circular disc 14. This limitation is due to the one-half count displacement in a leading or lagging direction established by the lowest order bit becoming smaller in terms of linear dimension as the tracks approach the inner diameter or the center of the disc. In addition, minor imperfections, such as eccentricity of the encoding disc, dictate the limiting values of this linear dimension.

This limitation has been overcome by modification of the basic structure shown in FIG. 2 through the use of one of the higher order tracks functioning as a selector track. As indicated hereinabove, and as a re-examination of Table I indicates, any bit in the binary code alternates between the values zero and one in a periodic manner similar to the $2^0$ bit and, therefore, any bit of $2^n$ power may be chosen to control the selection of all of the bits of the orders $2^{n+1}$ through $2^m$, where $m$ represents the order of the most significant bit on the disc, just as the $2^0$ bit was used to control the selection of bits $2^1$ through $2^n$. The selection is made according to the above-identified rule, but, operating in this mode does not require an additional external selecting element since all secondary selection can be accomplished through the use of sensing elements or brushes alone. This technique allows the leading and lagging segments of all bits of the order $2^{n+1}$ through $2^m$ to be displaced in a leading or lagging direction a distance equal to one-half of $2^n$ rather than one-half of $2^0$, thereby increasing the utilizable linear dimension of the higher order tracks. This increased displacement means that all bits of the order $2^{n+1}$ through $2^m$ will have the same margin between segment edge and brush position at the time selection occurs.

Figure 3:
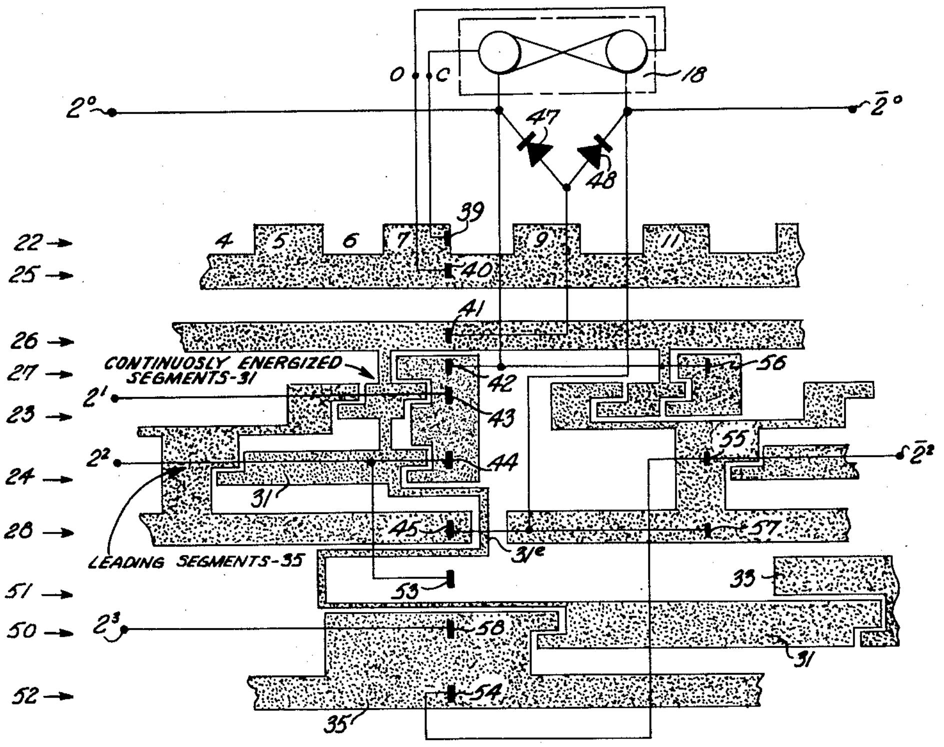
Figure 5:
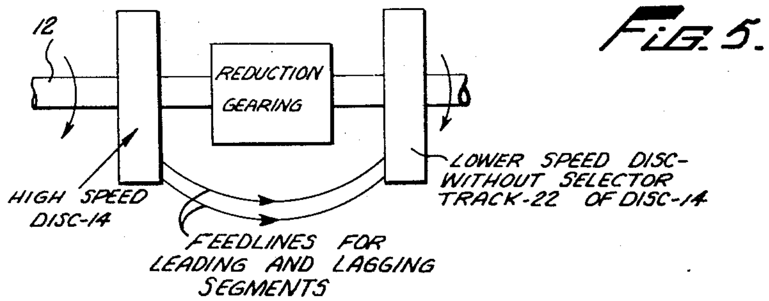
FIG. 5 is a diagrammatic representation of the multi-turn encoding arrangement utilizing the encoding patterns of this invention.

Now, referring to FIG. 3, it will be noted that the arrangement for the bits $2^0$ through $2^2$ is the same as shown and described hereinabove. This grouping of tracks may be considered as a first band and the $2^2$ track or track 24 may be considered as the $2^n$ track. Therefore, the track 24 will be utilized to select the leading and lagging segments for a second band of information tracks which comprises the bits of the order $2^{n+1}$ through $2^m$. For simplicity of illustration and discussion, only the $2^3$ track or $2^{n+1}$ is shown in FIG. 3. The $2^3$ track is arranged in a track identified by the reference character 50. It will be recognized that the other higher order bits are arranged in the same fashion, as will be described hereinafter. The same requirements prevail for the arrangement of FIG. 3 wherein the binary ones are represented by three electrically isolated segments and which central segment 31 must be connected to the continuously conductive track 26. By examining FIG. 2 it will be noted that the segment arranged in the track 28, which provides the feed paths from the selector element 18 by means of its brush 45 into the information tracks, is continuous throughout its length. Therefore, some arrangement of feed segments must be found to not only provide a circuit path by means of the central conductive segments 31 in the first band to the central conductive segments in the second band, that is, if it is assumed that the excitation will be derived from the track 26 or the track 25.

The continuous conductive segment in the leading track 28, for the purpose of feeding the second band, is broken at a point where the energization or de-energization of the leading feed brush 45 will not produce an erroneous output indication from the encoder. By examining FIG. 3, it will be noted that this relationship exists, since a feed segment $31^e$ which extends from the central portion of the central conductive segment 31 in track 24 outwardly therefrom and longitudinally between the track 24 and the track 28 and then transversely through the insulative portion between the conductive segments in track 28 and then running back in the reverse direction parallel with the track 28 a predetermined distance and then transversely across the track 51 to the information track 50 for the $2^3$ bit to be connected to the central conductive segment 31 arranged therein. The track 51 is considered as the lagging track for the second band while the track 52, which is arranged on the opposite side of the information track 50, is considered as the leading track for this second band and is provided with a similar conductive segment 35 as provided for the track 28. It will be noted that the feed segment $31^e$ extending through the track 28 is spaced between the opposite edges of the adjacent conductive segment and that this spacing is not of any significance with respect to the digital output indication since at this time the brushes 43 and 44 are in engagement with the lagging segment 33 and, therefore, the energization or de-energization of the leading segment 35 cannot effect their electrical condition. In the same fashion, the engagement of the brush 45 with the feed segment $31^e$ and the subsequent disengagement therefrom will not produce a change in the electrical output from the brushes 43 and 44 when they are in engagement with a non-conductive information portion in their respective information tracks 23 and 24. In addition, the portion of the feed segment $31^e$ extending from the track 28 to the track 50 through the track 51 is defined around the sensing element or brush 53 provided for the track 51.

If it is assumed that the first conductive segment in track 22 represents the binary one for the count five and the succeeding non-conductive segment arranged to the right thereof represents the binary zero for the count six, it will be shown that it will not effect the lagging segments in the second band or produce an erroneous output signal. The central conductive segment 31 for the information track 51 is defined to have a length as indicated hereinabove and it will be seen from examining Table I to be governed by the fact that the $2^3$ bit is on for eight counts and off for eight counts. In the same fashion, the one-half count displacement of the lagging and leading segments 33 and 35, respectively, are displaced two counts, or one-half of the $2^2$ bit. The lagging segment 33 in the second band extends in the lagging track 51 to be energized by means of the feed brush 53 arranged therein, while the conductive segment 35 for the leading segments is arranged in the track 52 and is energized by means of the feed brush 54. The lagging feed brush 53 is connected directly to the feed brush 44 or the $2^2$ brush in the first band, and is energized and de-energized in accordance with the values of the $2^2$ bit shown in Table I.

In order to provide the excitation for the leading feed brush 54, an additional brush is provided in the track 24 which may also be utilized as an information brush, as will be discussed more fully hereinafter. This additional brush is identified by the reference character 55 and is arranged in the track 24 a distance from the brush 44 equivalent to the length of the segments for the $2^2$ bit, or any odd multiple thereof to produce the binary complement of the $2^2$ bit. An electrical connection between the brush 55 is provided directly to the leading feed brush 54. Since the pattern of conductive segments in the lagging track 27 and the leading track 28 are discontinuous, a second brush is necessary in each of these tracks and connected in parallel with the first feed brushes to bridge this discontinuity and to assure that voltage is supplied to the feed brush 55 at all times that it should be energized. This additional brush for the track 27 is identified by the reference character 56, while the corresponding brush for the track 28 is identified by the reference character 57. The need for the pair of brushes may be better appreciated if it is considered that the brushes 55, 56, and 57 are arranged in alignment with the conductive segment for count seven and on the lagging segment 33. At this time the brush 55 should be energized but cannot be energized by means of the brush 57 and the leading segment 35 since it is in engagement with a lagging segment and, therefore, must be energized by means of the lagging brush 56 which, at this time, is engaging the segment 33. The remaining brush shown in FIG. 3 is identified by the reference character 58 and provides the output indications for the $2^3$ bit. The brush 58 is arranged in the information track 50. These connections insure that the switching between all the lagging and leading segments 33 and 35 occur simultaneously under the control of the single selecting element 18.

The operation for this modified pattern is the same then as described hereinabove for the basic arrangement of FIG. 2. The brushes are shown in position for indicating the count seven and which count should read 1 1 1 0. The brushes 39, 43, and 44 all are energized by the energization of the lagging segment 33 due to the brush 39 engaging a conductive segment at this time. They therefrom indicate the binary ones for the count seven. The brush 58 for $2^3$ is engaging a leading segment 35 and is dependent on the condition of brush 55, in turn dependent on the condition of brushes 45 and 57. The latter pair of brushes are de-energized and therefore the brush 58 and the $2^3$ value is zero.

When it is desired to provide not only true output indication of the shaft position but the binary complements thereof, it is readily provided by the arrangement of this invention simply by utilizing additional brushes for the information tracks other than the selector tracks. For the arrangement of FIG. 3, for example, additional brushes are necessary for all the information tracks except the selector tracks 22 and 24. It should be evident that since the two output circuits for the selecting element 18 are of a complementary nature, that the complement of the $2^0$ bit may be derived from the corresponding output of the selector circuit 18. In the same fashion, the brush 55 was arranged in the track 24 whereby it continually provides the complement of the brush 44 and, therefore, will provide the $\overline{2}^2$ bit. Therefore, for the remaining information tracks the complement of the bits may be obtained by placing a complement brush at a distance equivalent to the distance of a segment or any odd multiple thereof in the particular track. This placement of the complement brush must be such that it always produces the opposite output indication from the true brush, and it has been found that the pattern of the present invention will always provide this relationship, that is, whenever the true brush of a track contacts a lagging segment, the corresponding complement brush for that track contacts a leading segment and vice versa. As discussed hereinabove, the energization of the leading and lagging segments is alternately controlled by the selecting element 18, hence the true and complementary outputs can never be the same. The brush separation on these tracks also insures that whenever the true brush contacts a continuously energized or central segment 31, the corresponding complementary brush contacts a non-conducting segment and vice versa, and, therefore, maintains the desired complementary relationship.

Figure 4:
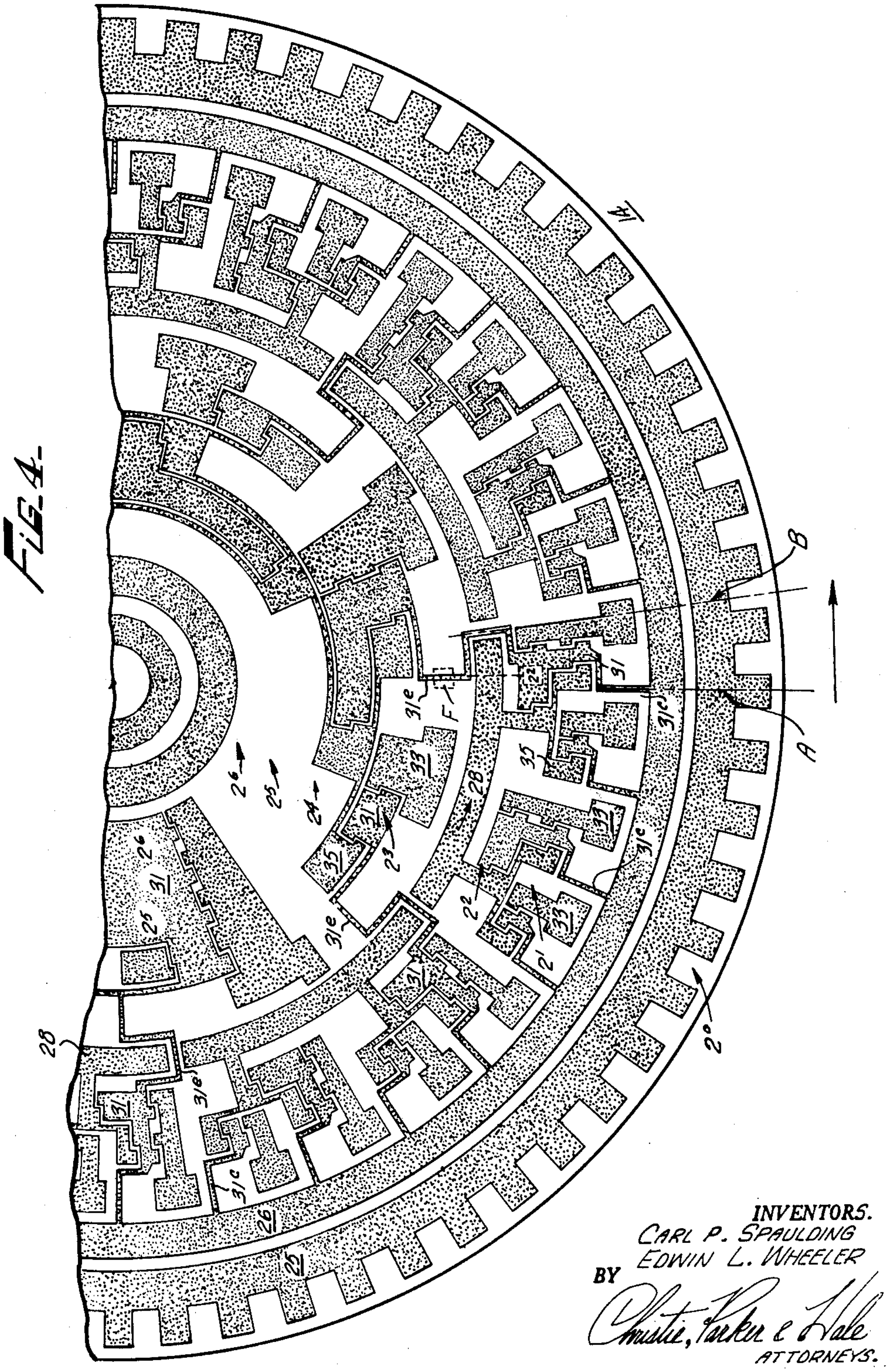
FIG. 4 is a top plan view of a portion of the actual pattern for a rotary encoding element defined in accordance with this invention.

Now referring to FIG. 4 wherein a portion of an actual disc 14 is illustrated having seven information tracks thereon for providing the binary bits $2^2$ through $2^6$ will be examined. The pattern illustrated in FIG. 4 is generally the same as shown in FIGS. 2 and 3 except that the feeder segments are accurately located to prevent erroneous output indications when both the true bit and the binary complement thereof is desired. To this end, the feeder segments are arranged so that when they are engaged by a feed sensing element they will couple a potential back to the sensing element to which it is directly connected and controlled by having the same potential as the latter sensing element.

Referring specifically to FIG. 4, it will be noted that the feed segment 31$^c$ is arranged in the track 27 so that its center line lies along the center line A of a conductive segment for the $2^0$ track, or track 22. Therefore, when the sensing element for the track 27 engages the feed segment 31$^c$, the selecting element 18 and, more particularly, the output thereof that follows the track 22 will have a relatively high potential and which high potential will be the same as the potential of the segment 31$^c$ engaging the lagging sensing element. Therefore, it should be clear that any voltage fed back by means of the lagging sensing element in track 27 when it engages the segment 31$^c$ will not produce an erroneous output since at the same time the controlling selector element output circuit is also at a high potential. To this same end, the feed segment on the opposite side of the segment 31 from the feed segment 31$^c$ that traverses the track 28 is arranged to have a center line coincident with the center line B for a non-conductive segment in the track 22. Therefore, when the sensing elements are aligned along this radial line B, the selecting element 18 will have the output circuit that is directly connected with the leading sensing element for track 28 at a relatively high potential, and, therefore, be at the same potential as is provided by the inter-engagement of the leading sensing element of track 28 and this feed segment. All of the feed segments for this one band are arranged and defined in the same fashion.

It will be recalled that in energizing the second band from the first band, the leading and lagging segments thereof are energized from the $2^2$ and $\overline{2}^2$ sensing elements. Therefore, the feed segments in the second band are arranged to fall centrally of the continuously conductive segment 31 in the first band that controls it. To this end, the feed sensing element shown in dotted outline and identified by the reference letter F in the second band of FIG. 4 engaging the feed segment 31$^e$ is energized from the $2^2$ brush in the track 24, also shown in dotted outline. Therefore, this feed segment 31$^e$ is arranged centrally of the segment 31, as shown, whereby a voltage fed back by the inter-engagement of the feed sensing element with the segment 31$^e$ will be at the same potential as the segment 31. This same feed segment arrangement, namely the feed segment 31$^e$, is utilized to energize the central conductive segments 31 for the information tracks providing the binary information $2^5$ and $2^6$. This may be seen by tracking the feed path from the track 26 by means of the feed segment 31$^c$ through the adjacent central conductive segment 31, for the $2^2$ bit, to the feed segment 31$^e$, through the leading feed track 28, and then to the common central conductive segment 31 for the tracks $2^5$ and $2^6$.

The present invention is also applicable to multi-turn encoders and which multi-turn encoders may be constructed by means of suitable reduction gearing, as is well known. All discs in a multi-turn encoder arrangement would be identical in appearance as the disc 14 of FIG. 4 except that on the slow-speed discs the outer, or selector, tracks such as the track 22, are omitted and the feed tracks for the next higher speed disc are energized by means of one of the information tracks in the second band of the high-speed disc, preferably the highest binary order track. A lower speed disc then would also be subdivided into a first and second band but with the first band being indirectly energized by the selector circuit 18 by means of an information track of the second band of the high speed disc.

The selection of the lagging and leading segments 33 and 35 on a slow speed disc is accomplished by means of brushes that are spaced apart in one of the information tracks in the second band in the same fashion as the brushes 44 and 55 are spaced on track 24. A pair of brushes connected and arranged in the same fashion as the brushes 56 and 57 are also necessary to feed the leading and lagging segments of the lower speed disc. The two information brushes, the true brush and the complement brush in one of the information tracks on the second band of the high speed disc 14, therefore, are connected to the feed brush for the leading and lagging tracks on the slow speed disc to energize same. These inter-connections must be provided also between successive slower speed discs in the encoder.

It should be noted that the connections between encoding discs are possible without resorting to the use of diodes with the pattern of FIG. 4.

In a typical thirteen bit encoder, the basic assembly may consist of two diodes and a single set of reduction gears. The input shaft 12 would connect directly to a high speed disc which may provide the first seven bits, or $2^0$ through $2^6$ bits of the binary code. The second, or low speed disc, will provide the remaining six bits, or $2^7$ through $2^{12}$. The ratio of the high speed disc to the low speed disc may be expressed as $2^P:1$, wherein P equals the number of bits on the low speed disc. In accordance with this formula, the reduction gear ratio for this specific encoding arrangement becomes 64:1 since the number of bits on the low speed disc is six ($2^6=64$). This ratio relates the speed of the high speed disc to that of the low speed disc. This same principle may be used for any number of discs, the only difference being in the values assigned to the exponents which define the bits.

In the thirteen bit encoder under consideration, then, the preferred inter-connections of the discs includes the connection of the $2^6$ brush of the high speed disc to the lagging feed brush for the first band of the low speed disc, while its complement, or $\bar{2}^6$ brush, is connected to the corresponding leading feed brush of the same band for the low speed disc. Other voltage feeder connections on the low speed disc involve the connections between the first and second bands of tracks thereon. The $2^8$ brush is connected in parallel with a lagging feed brush and the $\bar{2}^8$ brush is similarly connected to the leading feed brush of the second band. These connections correspond to the connections between the $2^2$ brush, or brush 44, and $\bar{2}^2$ brush, or brush 55, and with the brushes 53 and 54 on the high speed disc.

Although the invention has been described in terms of the natural or pure binary code, it will be evident to those skilled in the art that the output indications from the encoder may also be arranged to provide the binary coded decimal output indications, since the latter are dependent upon the natural binary code. However, it should be noted that the invention is applicable to any code and the code need not have a periodic or cyclic pattern, as described hereinabove, for the natural binary code. The only limitation for coding an element is that a combined information and selector track be employed for controlling the energization and de-energization of the higher order information sensing elements. In addition, it is recognized that arranging the sensing elements or brushes on one radial line simplifies the encoder and permits the use of inexpensive brush fabrication. However, the brushes need not be arranged on a radial line but may be staggered in any desired fashion since the electrical condition of the conductive segments in each track is the same for each odd multiple thereof as was indicated hereinabove in the discussion of the arrangement of the brushes for the complementing arrangement. Therefore, the brushes may be staggered in this fashion to provide the desired output indications if found to be convenient.

It, therefore, should be evident that this invention has provided an improved self-selecting U-scan encoder and, more particularly, an improved arrangement for a self-selecting encoding pattern that eliminates the use of diodes to obviate feedback or sneak circuits as a result of the pattern topology. In addition, the use of the encoding disc of this invention leads to direct interchangeability with present day self-selecting binary encoders without altering existing driver circuits.

What is claimed is:

1. A digitizer including a coding element having a first information track comprising conductive and non-conductive segments of substantially the same length alternately and sequentially arranged; a continuously conductive segment coextensive with and arranged adjacent said information track to have a circuit path to each of the conductive segments of said information track; three tracks arranged coextensive with said first-mentioned tracks comprising alternately arranged conductive and non-conductive segments and with the intermediate of said tracks functioning as another information track and the other tracks functioning as feed tracks and wherein the same information represented by a conductive segment on said first-mentioned track is defined on the another information track by a conductive segment therein comprising a central conductive segment arranged in said information track and having a feed segment extending transversely of the adjacent feed track and connected to the continuous conductive segment, a conductive segment spaced from the central conductive segment by a non-conductive segment a distance to allow a sensing element to bridge the non-conductive segment and the conductive segment extending a distance therefrom along said information track into the adjacent information portion represented by a non-conductive segment a distance corresponding to one-half of the length of the segments on said first information track, and a similarly defined and spaced segment arranged on the opposite side of the central segment and extending along said track the same distance into the adjacent non-conductive segment; one of said adjacent segments extending from the information track into the adjacent feed track while the other of said segments extends in the opposite direction into the remaining feed track, a separate sensing element for each of the above-defined tracks, the sensing elements corresponding to the information tracks providing electrical output indications corresponding to an energized conductive segment presented thereto, the other sensing elements providing a feed path from a switchable source of power when engaging a conductive segment, means for mounting the coding element and the sensing element for relative movement in accordance with the positions of a signal to be digitized, the sensing element for the continuously conductive segment being adapted to be directly connected to a source of excitation, the conductive feed segment for the central conductive segment traversing a feed track is arranged and spaced to cause the engagement and thereby the energization of the corresponding feed sensing element for the track to occur during an interval that will not effect the output signals from the coding element.

2. A digitizer as defined in claim 1 wherein the adjacent edge of said central conductive segment and the adjacent edges of the conductive segments spaced on opposite sides thereof are arranged in a complementary stepped pattern.

3. A digitizer as defined in claim 1 wherein the information tracks provide binary coded information whereby the conductive and non-conductive segments of these tracks only provide the electrical indications corresponding to binary quantities of one and zero and said another information track includes another sensing element arranged thereon and spaced from the other sensing element a distance equivalent to the width of an information portion on said track or any odd multiple thereof to provide an electrical output indication that is always the binary coded complement of the signal provided by said other sensing element.

4. A shaft position digitizer including a coding element having a first information track comprising conductive and non-conductive segments of substantially the same length alternately and sequentially arranged; a continuously conductive segment coextensive with and arranged adjacent to said information track to have a circuit path to each of the conductive segments of said information track; three tracks arranged coextensive with said first-mentioned tracks comprising alternately arranged conductive and non-conductive segments and with the intermediate of said tracks functioning as another information track and the other tracks functioning as controlled feed tracks and wherein the same information represented by a conductive segment on said first-mentioned information track is defined on the another information track by a conductive segment therein comprising a central conductive segment arranged in said information track and having a feed segment extending transversely of the adjacent feed track and connected to the continuous conductive segment, a conductive segment insulatively spaced from the central conductive segment a distance to allow a sensing element to bridge said insulative gap and extending a distance therefrom along said information track into the adjacent information portion represented by a non-conductive segment a distance corresponding to one-half of the length of the segments on said first information track, and a similarly defined and spaced segment arranged on the opposite side of the central segment and extending along said track the same distance into the adjacent information portion; one of said adjacent segments extending transversely from the information track into the adjacent feed track while the other of said segments extends in the opposite direction into the remaining feed track, a separate sensing element for each of the above-defined tracks, the sensing elements corresponding to the information tracks providing electrical output indications corresponding to an energized conductive segment presented thereto, the other sensing elements providing a feed path from an excitation source when engaging a conductive segment, means for mounting the coding element and the sensing element for relative movement in accordance with the positions of a shaft to be digitized, the sensing element for the continuously conductive segment being adapted to be directly connected to a source of excitation, and a single circuit element having two stable states and an output circuit corresponding to each state connected to the sensing element for said first-mentioned information track, each of the output circuits of said circuit element being separately connected to one of the sensing elements for the feed tracks to be energized and de-energized therefrom, the conductive feed segment for the central conductive segment traversing a feed track is arranged and spaced to cause the engagement and thereby the energization of the corresponding feed sensing element for that track to occur during an interval that will not cause an erroneous output indication from the digitizer.

5. A shaft position digitizer as defined in claim 4 wherein the adjacent edge of said central conductive segment and the adjacent edges of the conductive segments spaced on opposite sides thereof are arranged in a complementary stepped pattern, and said outer conductive segments become energized by means of said circuit element at an interval prior to the positioning of the information sensing element of said another information track in bridging relationship with these segments in response to the energization and de-energization of the other information sensing element to thereby cause these segments to be at the same electrical level at this interval.

6. A shaft position digitizer including a coding element having a first information track comprising conductive and non-conductive segments of substantially the same length alternately and sequentially arranged to provide binary coded information and functioning as a selector controlling track; a continuously conductive segment coextensive with and arranged adjacent said information track to have a circuit path to each of the conductive segments of said information track; at least four tracks arranged coextensive with said first-mentioned tracks comprising alternately arranged conductive and non-conductive segments and with the inner pair of said tracks functioning as information tracks and the other tracks functioning as controlled feed tracks and wherein the same binary information represented by a conductive segment on said first information track is defined by a conductive segment on the other information tracks comprising a central conductive segment arranged with a body portion in each of said information tracks and having a feed segment extending transversely of the adjacent feed track and connected to the continuous conductive segment and another feed segment extending between the body portions arranged in each of the information tracks, a conductive segment spaced from the central conductive segment a distance to allow a sensing element to bridge said segments and extending a distance along said information track into the adjacent information portion representing the other kind of binary information a distance corresponding to one-half of the length of the segments on said first information track, and a similarly defined and spaced segment arranged on the opposite side of the central segment and extending along said track the same distance into the adjacent segment; one of said adjacent segments extends across the information tracks and along the adjacent feed tracks and is spaced from the continuously conductive segment while the other of said segments extends in the same fashion across the information tracks and extending in the opposite direction along the remaining feed track, a separate sensing element for each of the tracks, the sensing elements corresponding to the information tracks providing binary coded electrical output indications only when an energized conductive segment is presented thereto, the other sensing elements providing a feed path from a switchable source of power when engaging a conductive segment and the source is switched thereto, means for mounting the coding element and the sensing element for relative movement in accordance with the positions of a shaft to be digitized, the sensing element for the continuously conductive segment being adapted to be directly connected to a source of excitation, and a single feed track selecting and energizing element having two stable states with an output circuit corresponding to each state and an input circuit connected to the sensing element for said first-mentioned information track to be continuously switched in state in accordance with the segment presented to the element, each of said output circuits are separately connected to one of the feed sensing elements to be energized and de-energized therefrom in accordance with the state of the selecting element, the conductive feed segment for the central conductive segments extending from the continuously conductive segment across the adjacent feed track to the body portion of the segment in the information track in a spaced arrangement to be presented to and thereby cause the energization of the corresponding feed sensing element for that track to occur during an interval that will not produce an output indication while the feed segment extending between body portions in the information tracks is arranged out of the path of the information sensing elements.

7. A shaft position digitizer including a shaft mounting a rotary element having a first information track recorded thereon adjacent its outer diameter in terms of conductive and non-conductive segments of substantially the same length alternately and sequentially arranged to provide binary coded information and functioning as a selector controlling track; a continuously conductive segment coextensive with and arranged inwardly of said information track to have a circuit path to each of the conductive segments of said information track; a first band of tracks including at least four tracks arranged coextensive with said first-mentioned tracks comprising alternately arranged conductive and non-conductive segments and with the inner pair of said tracks functioning as information tracks of successively higher binary order relative to said first track as the tracks approach the inner diameter of said element and the other tracks functioning as controlled feed tracks and wherein the same binary information represented by a conductive segment on said first information track is defined by a conductive segment on the other information tracks comprising a central conductive segment arranged with a body portion in each of said information tracks and having a feed segment extending transversely of the adjacent feed track and connected to the continuous conductive segment and another feed segment extending between the body portions arranged in each of the information tracks, a lagging conductive segment spaced from the central conductive segment to allow a sensing element to bridge said segments and extending a distance along said information track in the direction of rotation of said shaft into the adjacent information portion representing the other kind of binary information a distance corresponding to one-half of the length of the segments on said first information track, and a similarly defined and spaced leading segment arranged on the opposite side of the central segment and extending along said track the same distance into the adjacent segment; one of said adjacent segments extends across the information tracks and along the adjacent feed track the same distance and is spaced from the continuously conductive segment while the other of said segments extends in the same fashion across the information tracks and extending in the opposite direction along the remaining feed track as a conductive segment, a separate sensing element for each of the tracks, the sensing elements corresponding to the information tracks providing binary coded electrical output indications only when an energized conductive segment is presented thereto, the other sensing elements providing a feed path from a controlled source of power when engaging a conductive segment, the sensing element for the continuously conductive segment being adapted to be directly connected to a source of excitation, a single feed track selecting and energizing element having two stable states with an output circuit corresponding to each state and an input circuit connected to the sensing element for said first-mentioned information track to be continuously switched in state in accordance with the segment presented to the element, each of said output circuits are separately connected to one of the feed sensing elements to be energized and de-energized therefrom in accordance with the state of the selecting element, the conductive feed segment for the central conductive segment extending from the continuously conductive segment across the adjacent feed track to the body portion of the segment in the information track in a spaced arrangement to be presented to and thereby cause the energization of the corresponding feed sensing element for that track to occur during an interval that will not produce an output indication while the feed segment extending between body portions in the information tracks is arranged out of the path of the information sensing elements, a second band of tracks spaced inwardly of said first band and including at least another information track representative of the next higher binary order and leading and lagging feed tracks defined in the same fashion as the tracks in the first band except the length of the extension of the leading and lagging segments into the adjacent information portions correspond to one-half of the length of the segments on one of the information tracks in the first band, another sensing element for said one information track spaced from the other sensing element a distance corresponding to the length of the segments thereon or an odd multiple thereof, a feed segment extending from the body portion of the highest binary order information track and in a spaced relationship through the conductive segment of the leading feed track to be connected to the body portion of the central conductive segment in the next higher binary order information track in the above-mentioned fashion to prevent the production of an output indication, another sensing element separately arranged in the leading and lagging feed tracks of the first band and connected in parallel circuit relationship with the first-mentioned sensing element therefor and spaced therefrom a distance to bridge the discontinuities in the leading and lagging segments and thereby provide excitation for said other sensing element of said one information track in the first band, a sensing element for each track in the second band, the sensing element for the lagging track of the second band is connected to be energized by the first-mentioned sensing element of said one track in the first band while the sensing element for the leading track is connected to be energized by the latter-mentioned sensing element of said one track in the first band.

8. A shaft position digitizer as defined in claim 7 wherein the sensing elements are brushes mounted to continually engage said rotary element and in alignment with their respective tracks, the lowest order binary information is derived from one of the output circuits of said selecting element while the other binary information is derived from the brushes of the corresponding information tracks.

9. A shaft position digitizer as defined in claim 7 wherein the lowest order binary information and the complement thereof is derived from the output circuits of said selecting element and each of the remaining information tracks except one are provided with an additional sensing element spaced thereon to provide the binary complement of the information provided by the first sensing element and said another sensing element of said one track in the first band providing the complementing information therefor.

10. A shaft position digitizer as defined in claim 7 wherein said rotary element is further characterized as a high speed disc and includes at least another rotary element adapted to be driven by said shaft, the another rotary element having a plurality of information and feed tracks defined in the same fashion as said tracks in the second band of said first-mentioned rotary element, the information tracks of said another rotary element functioning to provide successively higher orders of binary information as the tracks approach the inner diameter of said rotary element, the outer of said information tracks providing the next higher binary order with respect to the highest binary order on the first rotary element, a plurality of sensing elements for the tracks on said another rotary element arranged in the same fashion as the sensing elements for the second band of said first-mentioned element, the sensing elements for the leading and lagging segments on said another rotary element being connected to the sensing elements for one of the tracks in said second band to be energized therefrom in the same fashion as said leading and lagging tracks in said second band are energized by means of one of the information tracks in the first band of said first rotary element, said plurality of sensing elements for the second band of said first rotary element including a corresponding plurality of sensing elements arranged and spaced on said one track of the second band in the same fashion as the corresponding sensing elements are arranged in the first band and connected to energize the sensing elements for the leading and lagging segments on said another rotary element, and reduction gearing means connected to be driven by said shaft and drive said another rotary element at a predetermined lower speed.

11. A shaft position digitizer as defined in claim 10 wherein the speed reduction gearing means provides a speed reduction of high speed to low speed defined by the ratio: $2^P$:1, wherein P equals the number of binary orders on the lower speed rotary element.

12. A coding element for a shaft position digitizer including a rotary element having a first information track recorded thereon adjacent its outer diameter in terms of conductive and non-conductive segments of substantially the same length alternately and sequentially arranged to provide binary coded information; a continuously conductive segment coextensive with said information track to have a circuit path to each of the conductive segments of said information track; a first band of tracks including at least four tracks arranged coextensive with said first-mentioned tracks comprising alternately arranged conductive and non-conductive segments and with the inner pair of said tracks functioning as information tracks of successively higher binary order relative to said first track as the tracks approach the inner diameter of said element and the other tracks functioning as feed tracks and wherein the same binary information represented by a conductive segment on said first information track is defined by a conductive segment on the other information tracks comprising a central conductive segment arranged with a body portion in each of said information tracks and having a feed segment extending transversely of the adjacent feed track and connected to the continuous conductive segment and another feed segment extending between the body portions arranged in each of the information tracks, a lagging conductive segment spaced from the central conductive segment to allow a sensing element to bridge said segments and extending a distance along said information track in the direction of rotation of said shaft into the adjacent information portion representing the other kind of binary information a distance corresponding to one-half of the length of the segments on said first information track, and a similarly defined and spaced leading segment arranged on the opposite side of the central segment and extending along said track the same distance into the adjacent segment; one of said adjacent segments extends across the information tracks and along the adjacent feed track the same distance and is spaced from the continuously conductive segment while the other of said segments extends in the same fashion across the information tracks and extending in the opposite direction along the remaining feed track as a conductive segment, the conductive feed segment for the central conductive segment extends from the continuously conductive segment across the adjacent feed track to the body portion of the segment in the information track in a spaced arrangement to be presented to and thereby cause the energization of the corresponding feed sensing element for that track to occur during an interval that will not produce an output indication while the feed segment extending between body portions in the information tracks is arranged out of the path of the information sensing elements, a second band of tracks spaced inwardly of said first band and including at least another information track representative of the next higher binary order and leading and lagging feed tracks defined in the same fashion as the tracks in the first band except the length of the extension of the leading and lagging segments into the adjacent information portions correspond to one-half of the length of the segments on one of the information tracks in the first band, a feed segment extending from the body portion of the highest binary order information track and in a spaced relationship through the conductive segment of the leading feed track to be connected to the body portion of the central conductive segment in the next higher binary order information track in the above-mentioned fashion to prevent the introduction of an output indication.

13. A coding element for a digitizer including a coding member having a first information track comprising conductive and non-conductive segments of substantially the same length alternately and sequentially arranged; a continuously conductive track coextensive with and arranged adjacent said information track to have a circuit path to each of the conductive segments of said information track; three tracks arranged coextensive with said first-mentioned tracks comprising alternately arranged conductive and non-conductive segments and with the intermediate of said tracks functioning as another information track and the other tracks functioning as controlled feed tracks and the same information represented by a conductive segment on said first-mentioned track being defined by a conductive segment on said another track comprising a central conductive segment arranged in said information track and having a feed segment extending transversely of the adjacent feed track and connected to the continuous conductive segment, a conductive segment insulatively spaced from the central conductive segment a distance to allow a sensing element to bridge said insulative gap and extending a distance therefrom along said information track into the adjacent portion represented by a non-conductive segment a distance corresponding to one-half of the length of the segments on said first information track, and a similar defined and spaced segment arranged on the opposite side of the central segment and extending along said track the same distance into the adjacent non-conductive segment; one of said adjacent segments extending from the information track into the adjacent feed track while the other of said segments extends in the opposite direction into the remaining feed track, the conductive feed segment for the central conductive segment traversing a feed track is arranged and spaced to occur during an interval that the energization of the corresponding feed sensing element for that track will be at the same level of energization as the sensing element from which it is controlled and will not cause an erroneous output indication from the digitizer.

14. A coding element as defined in claim 13 including at least another information track arranged intermediate said controlled feed tracks of the three tracks and comprising a first band, a second band of information and controlled feed tracks arranged coextensively with the first band and adapted to have the controlled feed tracks energized from said another information track, the conductive feed segment for the central conductive segment of the first band traversing a feed track from said continuously conductive track arranged substantially centrally of a conductive segment on the first information track and the conductive feed segments extending from a central conductive segment of said another information track through the other controlled feed segment of the first band is arranged substantially centrally of a non-conductive segment of the first information track and extends into the second band and is arranged thereon to be substantially centrally of the conductive segment from which it is energized to cause it to feed back to this segment the same voltage that the segment has assumed when a sensing element engages this feed segment and thereby prevents erroneous output indications.

No references cited.